3,497,540
HYDROXY-SUBSTITUTED SILICON-CONTAINING
CARBORANES AND NEOCARBORANES
Stelvio Papetti, Hamden, Conn., assignor to Olin Mathieson Chemical Corporation, a corporation of Virginia
Continuation-in-part of applications Ser. No. 310,979,
Sept. 20, 1963, and Ser. No. 375,278, June 15, 1964.
This application Sept. 20, 1967, Ser. No. 669,244
Int. Cl. C07f 7/08, 5/02
U.S. Cl. 260—448.2         5 Claims

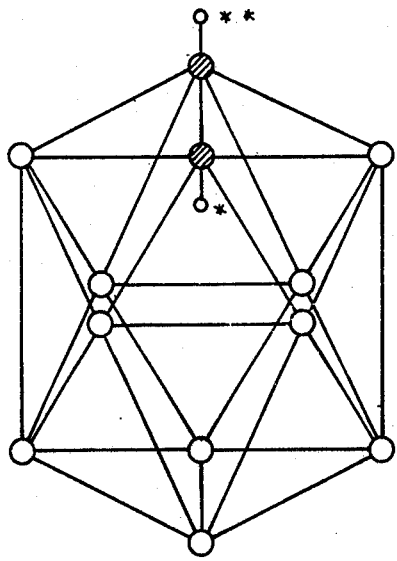
FORMULA - I
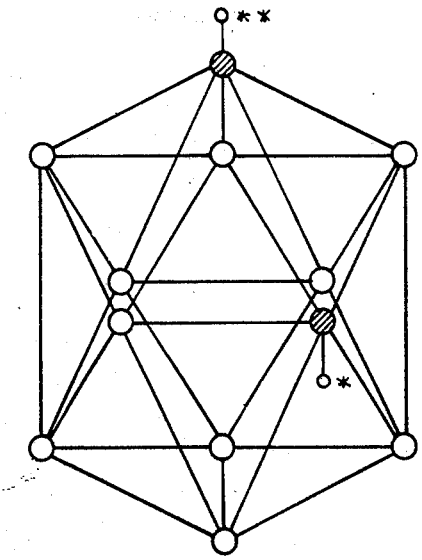
FORMULA - II
○ BORON
⊘ CARBON
○ HYDROGEN ON CARBON
(HYDROGEN ATOMS ON BORON
OMITTED FOR CLARITY)
INVENTOR:
STELVIO PAPETTI
BY Walter D. Hunter
AGENT United States Patent Office 3,497,540
Patented Feb. 24, 1970

ABSTRACT OF THE DISCLOSURE

Hydroxy-substituted, silicon-containing carboranes and neocarboranes are prepared by reacting a stoichiometric excess of water with a bis(haloalkylsilyl) carborane or neocarborane in the presence of an inert organic solvent. The compounds are used in fuel compositions suitable for use as fuels in rockets, jet engines, and ramjets.

This application is a continuation-in-part of application Ser. No. 310,979, filed Sept. 20, 1963, now abandoned, and of co-pending application Ser. No. 375,278, filed June 15, 1964, now abandoned.

This invention relates to the preparation of silicon-containing organoboranes and to a method for their preparation.

The novel silicon-containing organoboranes of this invention include carborane compounds having the general formula:

$$RR'B_{10}H_8[C(Si(OH)_nR''_{(3-n)})]_2$$

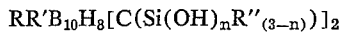

wherein R and R' are each selected from the group consisting of hydrogen and an alkyl radical containing from 1 to 5 carbon atoms, R" is an alkyl radical having from 2 to 5 carbon atoms, and $n$ is an integer of from 1 to 3 inclusive. The novel silicon-containing organoboranes of this invention also include neocarboranes having the general formula:

$$R''_{(3-n)}(HO)_nSiCB_{10}H_8RR'CSi(OH)_nR''_{(3-n)}$$

wherein R and R' are each selected from the group consisting of hydrogen and an alkyl radical containing from 1 to 5 carbon atoms, R" is an alkyl radical having from 1 to 5 carbon atoms or aryl of not more than 8 carbon atoms, and $n$ is an integer from 1 to 3 inclusive.

The novel compounds of this invention are prepared by reacting with a stoichiometric excess of water a compound selected from the group consisting of (A) a neocarborane compound of the formula:

$$R''_{(3-n)}X_nSiCB_{10}H_8RR'CSiX_nR_{(3-n)}$$

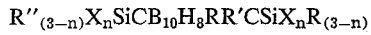

wherein R and R' are each selected from the group consisting of hydrogen and alkyl of from 1 to 5 carbon atoms, R" is selected from the group consisting of alkyl of from 1 to 5 carbon atoms and aryl of not more than 8 carbon atoms, X is a halogen selected from the group consisting of chlorine, bromine and iodine and $n$ is an integer of from 1 to 3 inclusive, and (B) a carborane compound of the formula:

$$RR'B_{10}H_8[C(SiX_nR''_{(3-n)})]_2$$

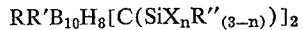

wherein R and R' are each selected from the group consisting of hydrogen and an alkyl radical containing from 1 to 5 carbon atoms, R" is an alkyl radical having from 2 to 5 carbon atoms, X is a halogen selected from the group consisting of chlorine, bromine and iodine and $n$ is an integer of from 1 to 3 inclusive.

The carborane-type compounds utilized as starting materials in the process of this invention which have the formula:

$$RR'B_{10}H_8[C(SiX_nR''_{(3-n)})]_2$$

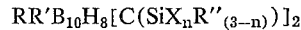

can be prepared by the method set forth in Papetti application Ser. No. 310,379, filed Sept. 20, 1963 for Compound and Process now U.S. Patent 3,366,656. For example, the compound $B_{10}H_{10}[C(SiCl(C_2H_5)_2)]_2$, (bis(chlorodiethylsilyl) carborane) can be prepared by reacting carborane ($B_{10}H_{10}[C(H)C(H)]$) successively with butyl lithium and dichlorodiethylsilane in an ether solution at ice bath temperature, the compound $(CH_3)_2$ $ClSiCB_{10}H_{10}CSiCl(CH_3)_2$ (bis(chlorodimethylsilyl) neocarborane) can be made by reacting neocarborane successively with butyl lithium and dichlorodimethylsilane in diethyl ether at ice bath temperature, and the compound bis(chlorodiphenylsilyl) neocarborane, which has the formula:

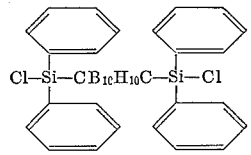

can be prepared by reacting neocarborane successively with butyl lithium, and dichlorodiphenylsilane under the same reaction conditions.

When organoboranes (i.e., carboranes) of the class:

$$RR'B_{10}H_8[C(H)C(H)]$$

wherein R and R' are each selected from the group consisting of hydrogen and an alkyl radical containing from 1 to 5 carbon atoms are heated to a temperature of above 400° C. a thermal isomerization takes place and the so-called neocarboranes are formed. For example, the compound carborane ($B_{10}H_{10}[C(H)C(H)]$) can be converted to neocarborane by heating in a sealed tube at a temperature of about 475° C. for 5 to 20 hours. Substituted neocarboranes can be prepared from the corresponding carboranes in the same manner. The structural formula of the compound carborane is shown as structural Formula I in the drawing while the structural formula of the compound neocarborane is shown as structural Formula II in the same drawing.

Compounds of the carborane type can be prepared by the reaction of decaborane or an alkylated decarborane having one to two alkyl groups containing 1 to 5 carbon atoms in each alkyl group with an acetylenic hydrocarbon containing from two to ten carbon atoms in the presence of a wide variety of ethers, nitriles or amines. The preparation of these compounds is described in application Ser. No. 741,967, filed June 13, 1958, of Ager, Heying and Mangold now abandoned. For example, carborane ($B_{10}H_{10}[C(H)C(H)]$), can be made by reacting for about 12 hours at 125° C. a mixture of decaborane and tetrahydrofuran in an autoclave pressured to 100 p.s.i. with acetylene.

Generally, the reaction is carried out at room temperature although temperatures of from about 0° C. to about 150° C. can be employed, if desired. Preferably, the reaction temperature is maintained between about 0° C. and 100° C. A stoichiometric excess of water is required in this novel hydrolysis reaction and, generally, from about 2.5 moles to about 250 moles or more of water will be employed per mole of the organoboron compound charged to the reactor. The reaction will usually be completed in from about 0.05 hour to about 4 hours or more depending upon the particular reaction conditions. It has been found in the reaction that the product can be conveniently separated from the reaction mixture by a variety of methods including extraction, evaporation of the reaction mixture followed by crystallization and filtration, etc. Although the reaction is ordinarily carried out at atmospheric pressures, if desired, pressures varying from sub-atmospheric up to about +5 atmospheres or more can be employed.

Preferably, the reaction is carried out in the presence of an inert organic solvent. Suitable solvents include, for example, water-miscible solvents, such as acetone, ethyl acetate, acetonitrile, dioxane and mixtures of these materials; aromatic hydrocarbons, such as benzene, toluene, xylene, etc.; aliphatic hydrocarbons such as pentane, hexane, heptane, etc., and ethers such as diethyl ether, di-n-propyl ether, diisobutyl ether, etc. Bis(haloalkylsilyl) carboranes suitable as starting materials in the method of this invention include, for example, bis(chlorodiethylsilyl) carborane, bis(chlorodi-n-butylsilyl) carborane, bis(chlorodiisoamylsilyl) carborane, bis(dichloroethylsilyl) carborane, bis(dichloro-n-propylsilyl) carborane, bis(dichloroamylsilyl) carborane, bis(dichloroisobutylsilyl) carborane, the corresponding neocarborane derivatives, and the corresponding bromine and iodine derivatives of both the neocarborane and carborane compounds mentioned. Bis(chlorodimethylsilyl) neocarborane, bis(dichloromethylsilyl) neocarborane, bis(chlorodiphenylsilyl) neocarborane, bis(dichloroxylylsilyl) neocarborane, bis(chloroditolylsilyl) neocarborane and the corresponding bromine and iodine derivatives are also useful starting materials.

The following examples illustrate specific embodiments of this invention and are not to be considered limitative. In the examples the term "moles" signifies "gram moles."

EXAMPLE I

Bis(hydroxydiethylsilyl) carborane (A)

Bis(chlorodiethylsilyl) carborane (1.5 g., 0.0039 mole) was dissolved in 30 ml. of acetone and 15 ml. of water was added slowly at room temperature. In the next step sufficient additional acetone was added to bring into solution the solid which has precipitated on addition of the water. The reaction mixture was then stirred for 2 hours. The solution was concentrated under reduced pressure to remove the acetone. Finally the remaining liquid residue was distilled under vacuum (about 0.1 mm.) yielding the compound bis(hydroxydiethylsilyl) carborane (Compound A), B.P. 145° C. (0.1 mm.).

*Analysis.*—Calc'd for $C_{10}H_{32}B_{10}O_2Si_2$: C, 34.43; H, 9.25; B, 31.05. Found: C, 33.85; H, 8.87; B, 30.00.

The compound bis(hydroxydiethylsilyl) carborane (Compound A) has the formula:

$$B_{10}H_{10}[C(Si(C_2H_5)_2OH)]_2$$

The structural formula of Compound A is the same as structural Formula I in the drawing with the exception that the hydrogen atoms indicated by the single and double asterisks are each replaced by the radical:

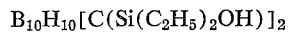

The liquid compounds of this invention, being derivatives of decarborane, are high energy materials. A valuable high energy liquid fuel can be prepared, for example, by dissolving up to about 25 weight percent of the compound:

$$B_{10}H_{10}[C(Si(C_2H_5)_2OH)]_2$$

based on the weight of the entire compositon; in JP-4 or kerosene. Such a fuel composition is suitable for use in rockets, jet engines and ramjets.

EXAMPLE II

Bis(hydroxydimethylsilyl) neocarborane (B)

Bis(chlorodimethylsilyl) neocarborane (2.0 g., mole) was dissolved in 25 ml. of acetone and about 10 ml. of water was added at room temperature. The resulting solution was concentrated under reduced pressure in order to remove most of the acetone present and to precipitate the product which was recovered by decantation and dried under vacuum at room temperature. Recrystallization of the crude product from petroleum ether (B.P., 65–110° C.) gave a nearly quantitative yield of bis(hydroxydimethylsilyl) neocarborane (Compound B—M.P. 98°–99.5° C.).

Compound B, which has the formula:

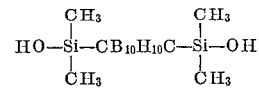

was analyzed for carbon, hydrogen and boron and the following results were obtained:

Calc'd for $C_6H_{24}B_{10}O_2Si_2$: C, 24.63; H, 8.27; B, 36.97. Found: C, 24.35; H, 8.25; B, 36.57.

The structural formula of Compound B is the same as structural Formula II in the drawing with the exception that the hydrogen atoms indicated by the single and double asterisks are each replaced by the radical:

EXAMPLE III

Bis(dihydroxymethylsilyl) neocarborane (C)

Bis(chloromethylsilyl) neocarborane (6.0 g., 0.016 mole) was dissolved in 50 ml. of acetone and 10 ml. of water at room temperature. After the solution had been stirred for about 1 hour at room temperature it was then allowed to evaporate at room temperature for about 18 hours. The solid product which precipitated out during the evaporation period was recrystallized from xylene yielding in 91 percent bis(dihydroxymethylsilyl) neocarborane (Compound C).

Compound C which has the formula:

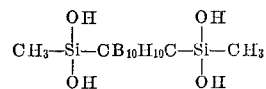

was analyzed for carbon, hydrogen, boron and silicon and the following results were obtained:

Calc'd for $C_4H_{20}B_{10}O_4Si_2$: C, 15.93; H, 6.67; B, 36.65; Si, 18.79. Found: C, 16.77; H, 6.80; B, 36.48; Si, 18.95.

The structural formula of Compound C is the same as structural Formula II in the drawing with the exception that the hydrogen atoms indicated by the single and double asterisks are each replaced by the radical:

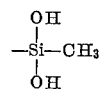

EXAMPLE IV

Bis(hydroxydiphenylsilyl) neocarborane (D)

Bis(chlorodiphenylsilyl) neocarborane (15.0 g., 0.026 mole) was dissolved in 50 ml. of acetone and about 10 ml. of water. The resulting solution was stirred at room temperature for 1.5 hours following which most of the acetone present was removed by evaporation under reduced pressure. The product which precipitated during the evaporation step, was recovered by decantation and then recrystallized from hexane. Bis(hydroxydiphenylsilyl) neocarborane (Compound D, M.P. 153°–155° C.) was recovered in 78 percent yield.

Compound D, which has the formula:

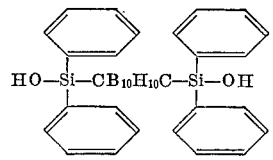

was analyzed for carbon, hydrogen, boron and silicon and the following results were obtained:

Calc'd for $C_{26}H_{32}B_{10}O_2Si_2$: C, 57.73; H, 5.96; B, 20.00; Si, 10.38. Found: C, 57.34; H, 5.96; B, 19.50; Si, 10.11.

The structural formula of Compound D is the same as structural Formula II with the exception that the hydrogen atoms indicated by the single and double asterisks are each replaced by the radical:

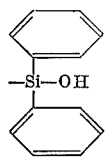

The liquid compounds of this invention, being derivatives of decarborane, are high energy material. A valuable high energy liquid fuel can be prepared, for example, by dissolving up to about 25 weight percent of the compound:

$$B_{10}H_{10}[C(Si(C_2H_5)_2OH)]_2$$

based on the weight of the entire composition; in JP-4 or kerosene. Such a fuel composition is suitable for use in rockets, jet engines and ramjets.

What is claimed is:

1. An organoboron compound selected from the group consisting of (A) a neocarborane compound of the formula:

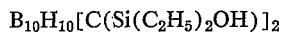

wherein R and R' are each selected from the group consisting of hydrogen and an alkyl radical containing from 1 to 5 carbon atoms, R'' is selected from the group consisting of alkyl of from 1 to 5 carbon atoms and aryl of not more than 8 carbon atoms, X is a halogen selected from the group consisting of chlorine, bromine and iodine and $n$ is an integer of from 1 to 3 inclusive, and (B) a carborane compound of the formula:

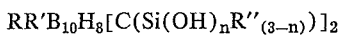

wherein R and R' are each selected from the group consisting of hydrogen and an alkyl radical containing from 1 to 5 carbon atoms, R'' is an alkyl radical containing from 2 to 5 carbon atoms, and $n$ is an integer of from 1 to 3 inclusive.

2. $B_{10}H_{10}[C(Si(C_2H_5)_2OH)]_2$.
3. $(CH_3)_2OHSiCB_{10}H_{10}CSiOH(CH_3)_2$.
4. $CH_3(OH)_2SiCB_{10}H_{10}CSi(OH)_2CH_3$.
5. 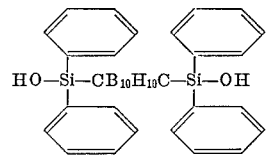

References Cited
UNITED STATES PATENTS

| | | |
|---|---|---|
| 3,366,656 | 1/1968 | Papetti. |
| 3,366,657 | 1/1968 | Papetti. |
| 3,374,259 | 3/1968 | Papetti. |
| 3,377,370 | 4/1968 | Papetti. |

TOBIAS E. LEVOW, Primary Examiner

P. F. SHAVER, Assistant Examiner

U.S. Cl. X.R.

44—76